(12) United States Patent
Leonard et al.

(10) Patent No.: US 6,359,937 B1
(45) Date of Patent: Mar. 19, 2002

(54) METHOD AND APPARATUS FOR PERFORMING ANALOG MODE OPERATIONS WHEN TRANSMITTING AUDIO AND DATA IN A WIRELESS TDMA SYSTEM

(75) Inventors: Eric David Leonard, Morris Township, Morris County; David James Thomson, Murray Hill, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/517,980

(22) Filed: Mar. 3, 2000

(51) Int. Cl.⁷ .............................................. H04L 27/20
(52) U.S. Cl. ...................................... 375/308; 375/279
(58) Field of Search ................................. 375/302, 298, 375/303, 308, 261, 268, 269, 270, 271, 272, 279, 295; 332/100, 117, 144, 149; 455/108, 109, 110

(56) References Cited

U.S. PATENT DOCUMENTS

| | | | | |
|---|---|---|---|---|
| 5,418,818 A | * | 5/1995 | Marchetto et al. | 375/264 |
| 5,960,040 A | * | 9/1999 | Cai et al. | 375/279 |
| 6,025,758 A | * | 2/2000 | Lu | 332/100 |
| 6,032,028 A | * | 2/2000 | Dickey et al. | 455/110 |
| 6,091,765 A | * | 7/2000 | Pietzold, III et al. | 375/219 |

* cited by examiner

Primary Examiner—Chi Pham
Assistant Examiner—Phuong Phu
(74) Attorney, Agent, or Firm—Thomas, Kayden, Horstemeyer & Risley LLP

(57) ABSTRACT

A method and apparatus are provided for use in a transceiver of a wireless system that enable analog mode operations to be performed using in-phase (I) and quadrature (Q) values. The apparatus comprises a processor that performs FM modulation to generate I, Q pairs when operating in the analog mode. When transmitting in the analog mode, the processor encodes a digital representation of the signal to be transmitted into I, Q pairs and outputs the I, Q pairs to a digital-to-analog converter (DAC) comprised by the apparatus. The DAC converts the digital I, Q pairs into analog signals and outputs the analog signals to a cosine wave generator, which generates an in-phase cosine wave and an out-of-phase cosine wave having amplitudes that are proportional to the I and Q values, respectively. The cosine waves are summed for transmission over air. When receiving in the analog mode, a digital down converter converts the received signal into digital I and Q values. The processor then demodulates the I and Q values into a digital representation of the received signal to extract the signal content. When transitioning from transmitting data to transmitting audio, and vice versa, the processor ensures that abrupt changes in the phases of the I, Q pairs do not occur.

29 Claims, 9 Drawing Sheets

US 6,359,937 B1

METHOD AND APPARATUS FOR PERFORMING ANALOG MODE OPERATIONS WHEN TRANSMITTING AUDIO AND DATA IN A WIRELESS TDMA SYSTEM

TECHNICAL FIELD OF THE INVENTION

The present invention relates to wireless systems and, more particularly, to a method and apparatus for performing analog mode operations in a wireless TDMA system, wherein in-phase (I) and quadrature (Q) values are used to represent audio information and data in the analog mode of operation.

BACKGROUND OF THE INVENTION

FIG. 1 illustrates a wireless system 1. The wireless system 1 comprises a plurality of cells 2, each of which comprises a transceiver 3 that is electrically coupled to an antenna 4. Each transceiver 3 and its respective antenna 4 together comprise a base station. In wireless systems that utilize the well-known time division multiple access (TDMA) communications protocol, digital voice and data are transmitted using I, Q pairs. The I, Q pairs are modulated/demodulated using a modulation/demodulation technique known as quadrature phase shift keying (QPSK). This is typically viewed as a TDMA mode of operation because the I, Q pairs are used to produce bit transitions that represent the voice and data. Therefore, this type of operation will be referred to hereinafter as the TDMA mode of operation.

Many TDMA systems in use today are also capable of operating in what is typically referred to as an analog mode of operation. In the analog mode, audio and data signals are transmitted by converting digital samples representative of the signals into analog signals and by FM modulating the analog signals for transmission over air. Therefore, the analog mode utilizes FM modulation as opposed to the QPSK modulation technique utilized in the TDMA mode. The standards for implementing the analog mode and the TDMA mode in a TDMA system are set forth in the Air Interface Standard, IS-138.

It is known in TDMA systems to utilize one set of hardware components in the transceiver front end for TDMA mode operations and another set of hardware components for analog mode operations. This is because data and voice are normally represented by I, Q pairs in the TDMA mode and by digital samples of the analog waveform in the analog mode. Also, separate hardware has been utilized for performing QPSK modulation and FM modulation. Of course, utilizing separate sets of hardware components increases the complexity of the transceiver as well as the costs associated with these components. It would be desirable to provide a transceiver that utilizes a single set of hardware components for TDMA mode and analog mode operations. Utilizing a single set of hardware components for both modes could reduce the costs and complexity of the transceiver.

FIG. 2 represents the components of a known transceiver of a wireless TDMA system for operating in the analog mode. The hardware components that are utilized in the transceiver for TDMA mode operations are not shown in FIG. 2 for ease of illustration. The hardware components that are utilized for the analog mode include the encoder 12, the decoder 13, the digital-to-analog converter (DAC) 14, the analog-to-digital converter (ADC) 15, the ADC 18, the DAC 19, the FM demodulation hardware 20 and the FM modulation hardware 21.

In order to transmit audio signals in the analog mode, a digital signal processor (DSP) 22 outputs a digital representation of an analog voice signal to the DAC 19, which converts the digital representation into an analog waveform and outputs the analog waveform to the FM modulation hardware 21. The FM modulation hardware 21 frequency modulates the analog waveform for transmission over air. When an FM modulated audio signal is received by the transceiver 10, the FM demodulation hardware 20 demodulates the analog audio signal and delivers the demodulated signal to the ADC 18, which converts the analog audio signal into a digital representation of the analog audio signal. The digital representation of the analog audio signal is then delivered to the DSP 22, which processes the digital signal in accordance with various software routines and delivers the processed digital signal to other components of the base station for routing to the mobile telephone switch office (MTSO).

When a data signal is to be transmitted by the base station to a mobile unit (not shown) using the analog mode, the main controller 23 delivers a digital representation of the data signal to the encoder 12, which encodes each bit of the digital data into a digital representation of the corresponding analog waveform. The encoded signal is then delivered to the DAC 14. The DAC 14 converts the encoded signal into an analog data signal, which is then delivered to the FM modulation hardware 21. The FM modulation hardware 21 FM modulates the signal for transmission over air.

When a data signal is received by the transceiver 10 when it is operating in the analog mode, the FM demodulation hardware 20 demodulates the RF signal, which is then converted by the ADC 15 into a digital signal. The digital signal is then delivered to the decoder 13, which decodes the digital signal into a digital message that is usable by the main controller 23. The decoder 13 then delivers the digital message to the main controller 23, which processes the digital message to extract the content. The main controller 23 of the base station routes the signals to the MTSO.

As stated above, separate hardware components are used for performing TDMA mode and analog mode operations in the TDMA system shown partially in FIG. 2. It would be advantageous to provide a transceiver that could perform all of these functions without the need for separate hardware components. Eliminating certain hardware components may reduce the complexity of the transceiver and the costs associated with the transceiver. Accordingly, a need exists for a method and apparatus for use in a transceiver that enable the same hardware components to be used for TDMA and analog mode operations.

SUMMARY OF THE INVENTION

The present invention provides a method and apparatus for use in a transceiver of a wireless system that enable analog mode operations to be performed using in-phase (I) and quadrature (Q) values. Since TDMA mode operations are normally performed using I and Q values, the method and apparatus of the present invention enable, but do not require, the same hardware components to be utilized for TDMA and analog mode operations. The apparatus of the present invention comprises a processor, such as, for example, a digital signal processor (DSP), that performs FM modulation to generate I, Q pairs when the transceiver is operating in the analog mode. The processor also performs the I, Q encoding and decoding operations that are normally performed in hardware in transceivers operating in the TDMA mode.

When transmitting in the analog mode, the processor encodes and FM modulates a digital representation of the signal to be transmitted into I, Q pairs and outputs the I, Q pairs to a digital-to-analog converter (DAC) comprised by the apparatus. The DAC converts the digital I, Q pairs into analog signals and outputs the analog signals to an I, Q cosine wave generator. The cosine wave generator generates an in-phase cosine wave and a quadrature cosine wave having amplitudes that are proportional to the I and Q values, respectively. The cosine waves are summed for transmission over air.

When receiving in the analog mode, a frequency converter converts the received radio frequency (RF) signal down to an intermediate frequency (IF). A digital down converter converts the received signal into digital I and Q values and outputs them to the processor. The processor then decodes the I and Q values into a digital representation of the received signal to extract the signal content.

Other features and advantages of the present invention will become apparent from the following description, drawings and claims.

DETAILED DESCRIPTION OF THE INVENTION

Figure 1:
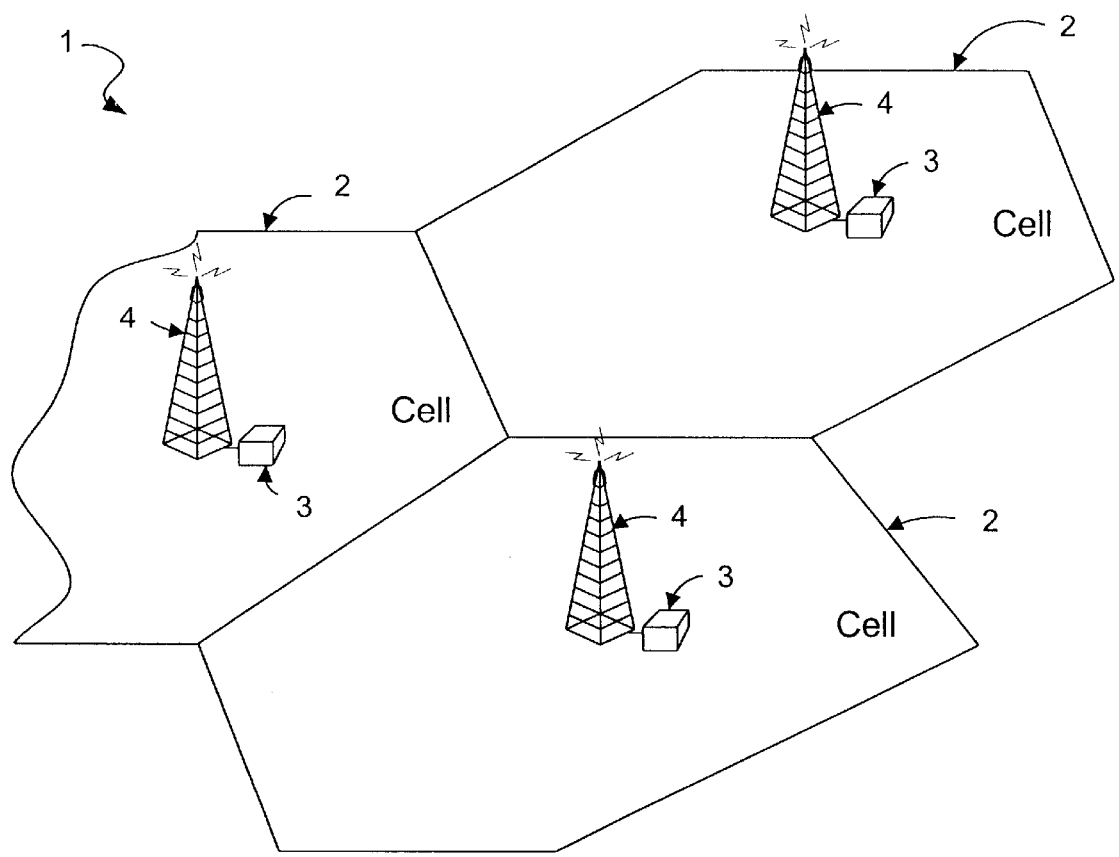
FIG. 1 is an illustration of a typical wireless system.
Figure 2:
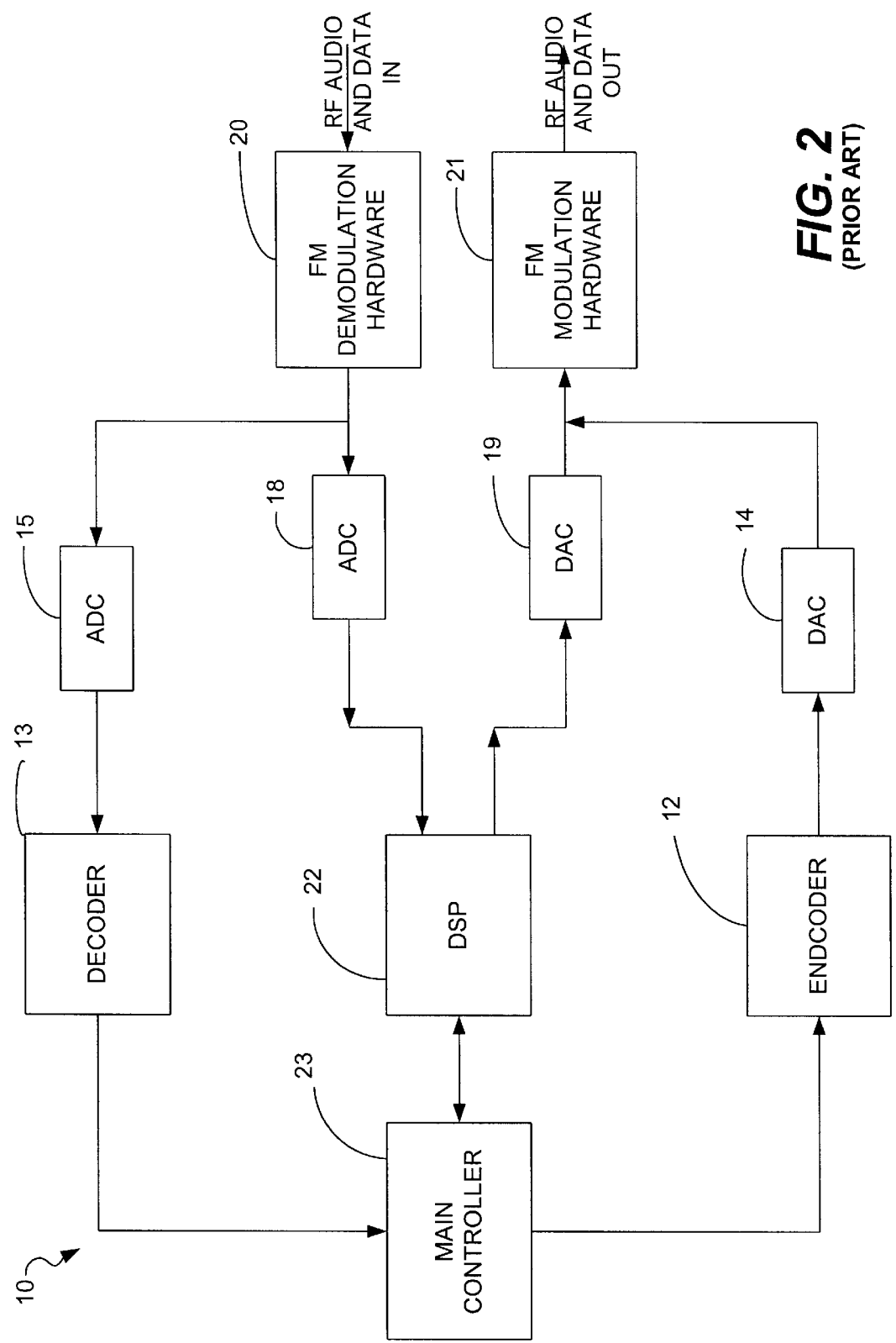
FIG. 2 is a block diagram of a known transceiver that can be utilized for analog mode operations for communicating over the wireless system shown in FIG. 1.
Figure 3:
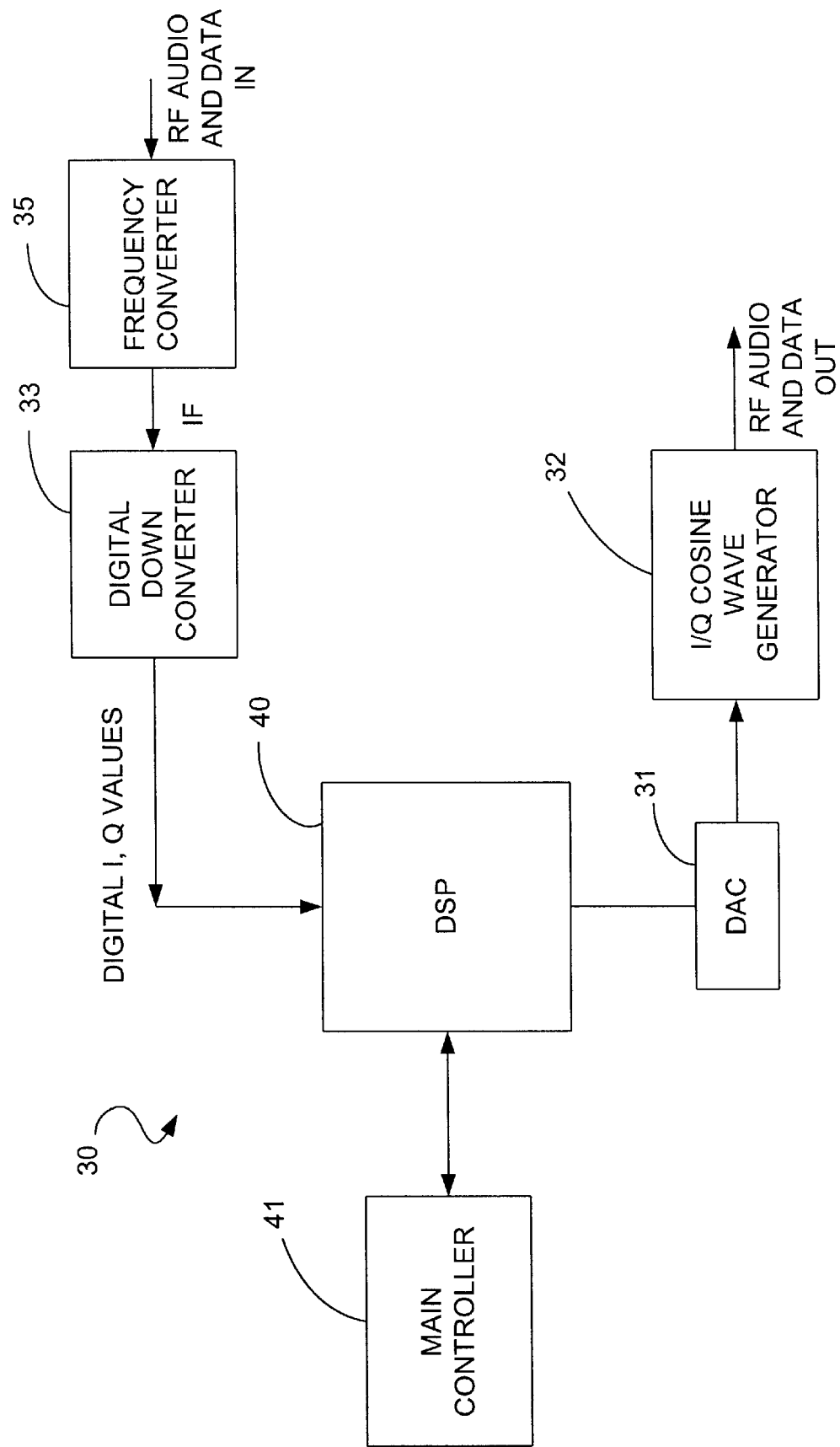
FIG. 3 is a block diagram of the transceiver of the present invention in accordance with the preferred embodiment.

FIG. 3 is a block diagram illustrating the components of the transceiver 30 of the present invention. In accordance with the present invention, a single set of hardware components may be utilized for communicating in both the TDMA mode and the analog mode over a wireless system, such as the wireless system 1 depicted in FIG. 1. As can be seen by comparing the known transceiver 10 of FIG. 2 with the transceiver 30 of the present invention shown in FIG. 3, several of the hardware components shown in FIG. 2 have been eliminated. In accordance with the present invention, I, Q pairs are utilized for representing data and audio signals in the analog mode. Therefore, the same hardware that is utilized for processing and modulating/demodulating audio and data signals in the TDMA mode may be utilized for analog mode operations. However, it should be noted that it is not a requirement of the present invention that the same hardware be utilized for analog and TDMA mode operations.

In accordance with the preferred embodiment, generation of the I, Q pairs and FM modulation is performed in firmware being executed being executed on a processor, such as, for example, a digital signal processor (DSP). The FM modulation and demodulation hardware components shown in FIG. 2 are no longer necessary because the components that are utilized for TDMA mode operations can also be utilized for analog mode operations. The manner in which the transceiver 30 of the present invention performs transmit and receive functions in the analog mode will now be discussed in detail. Also, although the present invention is being discussed with reference to performing analog mode operations in a TDMA system, it should also be noted that the principles and concepts of the present invention can also be applied to perform analog mode operations in other types of wireless systems.

In order to transmit audio signals in the analog mode, the DSP 40 delivers digital I, Q pairs to the DAC 31, which converts the digital I and Q values into analog I and Q values. The analog I and Q values are then delivered to an I/Q cosine wave generator 32, which converts the analog signals into an in-phase (I) cosine wave and an out-of-phase cosine wave. The quadrature phase cosine wave is 90° out of phase from the in-phase cosine wave. The in-phase cosine wave has an amplitude that is proportional to the analog I value and the out-of-phase cosine wave has an amplitude that is proportional to the analog Q value. The I/Q cosine wave generator 32 sums these cosine waves for transmission over air.

When the transceiver 30 is operating in the analog mode and receives an audio signal, the frequency converter 36 converts the received RF signal down to an intermediate frequency (IF). Typically, the RF frequency is in a range of 800 to 900 megahertz (MHz). In this case, the intermediate frequency will typically be approximately 80 MHz. However, the transceiver 30 of the present invention is not limited with respect to the RF or IF frequencies, as will be understood by those skilled in the art.

The digital down converter 33 converts the IF signal into digital I, Q pairs, which are then delivered to the DSP 40. The DSP 40 then processes the digital signals in accordance with various routines, which are described below in detail. Generally, the DSP 40 decodes the I, Q pairs and extracts the audio information. The DSP 40 communicates the extracted audio information to other components of the cell site that ultimately send the information to the MTSO.

The tasks performed by the DAC 31, the cosine wave generator 32, the digital down conversion component 33 when transmitting and receiving data in the analog mode are identical to those described above with respect to the transmission and reception of audio signals in the analog mode. However, the DSP 40 performs different functions depending upon whether the tasks it is performing are associated with audio or data signals. When audio signals are delivered to the DSP 40 for transmission over the wireless system, the DSP 40 processes the audio signals accordingly. When the base station sends data to the DSP 40, these signals are identified as corresponding to data and the DSP 40 processes the data signals accordingly.

In accordance with the present invention, the DSP 40 implements a transmit-audio routine, a transmit-data routine, a receive-audio routine and a receive-data routine. By performing these routines in the DSP 40, the need for hardware components for performing these different functions is eliminated. The transmit-audio routine performs the tasks associated with transmitting audio signals. The transmit-data routine performs the tasks associated with transmitting data signals. The receive-audio routine performs the tasks associated with receiving audio signals. The receive-data routine performs the tasks associated with receiving data signals. Therefore, the DSP 40 is programmed to execute software routines that perform these tasks.

A receive-audio routine that is suitable for use with the present invention is disclosed in U.S. Pat. No. 5,694,079, entitled "DIGITAL FM MODULATOR USING A LAGRANGIAN INTERPOLATION FUNCTION", which is assigned to the assignee of the present application and which is incorporated herein by reference in its entirety. Therefore, in the interest of brevity, a detailed discussion of the manner in which the tasks associated with demodulating and processing I, Q pairs representing audio information will not be provided herein.

In FM modulation, the FM modulated signal changes phase in a manner that is proportional to the amplitude of the input signal. When I, Q pairs are utilized to generate an FM modulated signal, the phase of the I, Q pairs must be altered to generate the appropriate phase changes in the FM modulated signal. By changing the I and Q values of the I, Q pairs, the phase of the FM modulated signal is changed in a manner that is proportional to the amplitude of the input signal. With respect to audio signals, the instantaneous frequency of the FM signal is proportional to the current amplitude of the audio input. In the digital realm, this is equivalent to causing the phase change of the next FM output, which is represented by the next I, Q pair, to be proportional to the next audio input level. The manner in which the phase change that is needed to represent the amplitude of an audio input sample is obtained is well known. Therefore, in the interest of brevity, a discussion of the manner in which the phase change representing an audio input sample is determined will not be provided herein.

Figure 4:
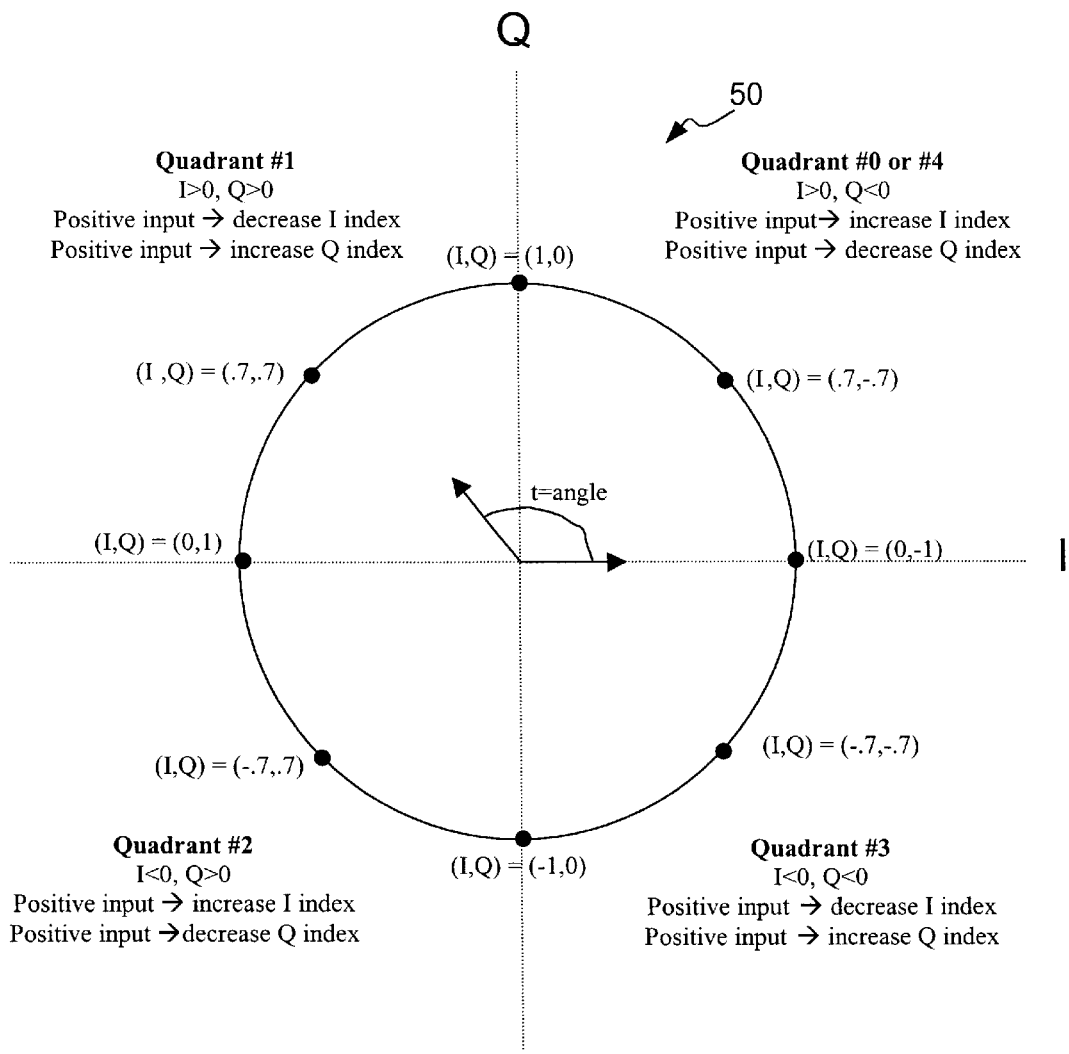
FIG. 4 is a diagram of a unit circle that illustrates the manner in which I, Q pairs are generated.

In accordance with the present invention, the I, Q pairs are generated in the following manner. A sample of the audio signal that is being modulated may be represented by a(n). A variable, n, corresponds to a sample index. In one implementation, which is mentioned merely as an example, n is incremented at a rate of 160 kilohertz (kHz), which means that 160,000 I, Q pairs are generated by the DSP 40 per second. Equation 1 defines the desired relationship between a(n) and the phase p(n) of the current sample, n:

$$p(n)=p(n-1)+k*a(n), \qquad \text{(Equation 1)}$$

where p(n−1) is the phase associated with the last audio sample, n−1, and k is an arbitrary scaling constant that is selected to obtain the desired relationship between a(n) and the peak frequency deviation of the modulated signal. By re-writing Equation 1 as follows: p(n)−p(n−1)=k*a(n), it can be seen that the change in phase is proportional to the amplitude of the current audio sample. The I and Q values, I(n) and Q(n), respectively, which are values on the unit circle 50 shown in FIG. 4, are obtained from Equation 2 as follows:

$$I(n)=\cos(p(n)), \text{ and}$$

$$Q(n)=\cos(p(n)-90 \text{ degrees}). \qquad \text{(Equation 2)}$$

The amplitude of the audio signal a(n) is utilized in accordance with Equations 1 and 2 by the transmit-audio routine executed by the DSP 40 to determine the I and Q values I(n) and Q(n). The algorithm represented by Equations 1 and 2 can be performed in a variety of ways, as will be understood by those skilled in the art. For example, the algorithm can be executed on the fly as the calculations need to be performed. Alternatively, a lookup table can be used to store the I and Q values to enable the appropriate I and Q values to be accessed by an index associated with the amplitude of the audio input sample.

The horizontal axis in FIG. 4 corresponds to the I value and the vertical axis corresponds to the Q value. Each I, Q pair, I(n), Q(n), corresponds to a point on the unit circle 50 shown in FIG. 4. The quadrant on the unit circle 50 that the point is in depends on the I and Q values. Once the I, Q pairs associated with a frame of audio signals have been obtained using the algorithm represented by Equations 1 and 2, they are delivered to the DAC 31, which converts them into analog values. These analog values are then delivered to the cosine wave generator 32. The I/Q cosine wave generator 32 generates an in-phase cosine wave having an amplitude proportional to the I value and an out-of-phase cosine wave having an amplitude proportional to the Q value. The out-of-phase cosine wave is substantially 90° out of phase from the in-phase cosine wave. These cosine waves are summed by the I/Q cosine wave generator 32 for transmission over air.

In accordance with the preferred embodiment, the I and Q values on the unit circle 50, which will hereinafter referred to as I__unit__circle and Q__unit__circle, respectively, are not sent directly to the DAC 31. Rather, they are first processed by a compensation routine to obtain the actual I and Q values that need to be output to the DAC 31 to ensure that the DAC 31 produces the correct voltage values and to ensure that the cosine wave generator 32 produces the correct quadrature waves. The compensation routine executed by the DSP 40 converts the unit circle (I,Q) pairs into (I,Q) pairs that cause the DAC 31 to produce the correct results. The DAC 31 and the cosine wave generator 32 suffer from the following canonical degradations which are corrected by the compensation routine:

(1) Different nonzero values for I and Q are typically needed to make the resulting voltages output from the DAC 21 equal zero. These nonzero I and Q values are referred to herein as Ioff and Qoff respectively.

(2) Different changes in the I and Q values are typically needed to obtain the same change in the resulting voltages output from the DAC 31. Hence, the I and Q values are scaled differently to compensate for this factor. These scaling factors are referred to herein as Iamp and Qamp, respectively.

(3) The resulting I and Q signals output from the I and Q generator of the cosine wave generator 32 are not exactly 90° apart. This phase error is defined as phase(Q)−phase(I)−90. Ideally, this phase error is 0, which will be the case if phase(Q) is separated from phase(I) by exactly 90°.

The compensation parameters used to compensate for these degradations preferably are specified by the main controller 41 through a compensation message that it sends to the DSP 40. When this message arrives at the DSP 40, the compensation routine is called to store these parameters in memory (not shown) in the DSP 40. The compensation Formulae are derived in the following manner. Ignoring offset errors, the following I and Q values (Iout and Qout) will be output from the DAC 31 when the DSP 40 generates Igen and Qgen, which correspond to the I and Q values that must be generated by the DSP 40 and output to the DAC 31 to ensure that the DAC 31 produces the correct voltages.

Figure 5:
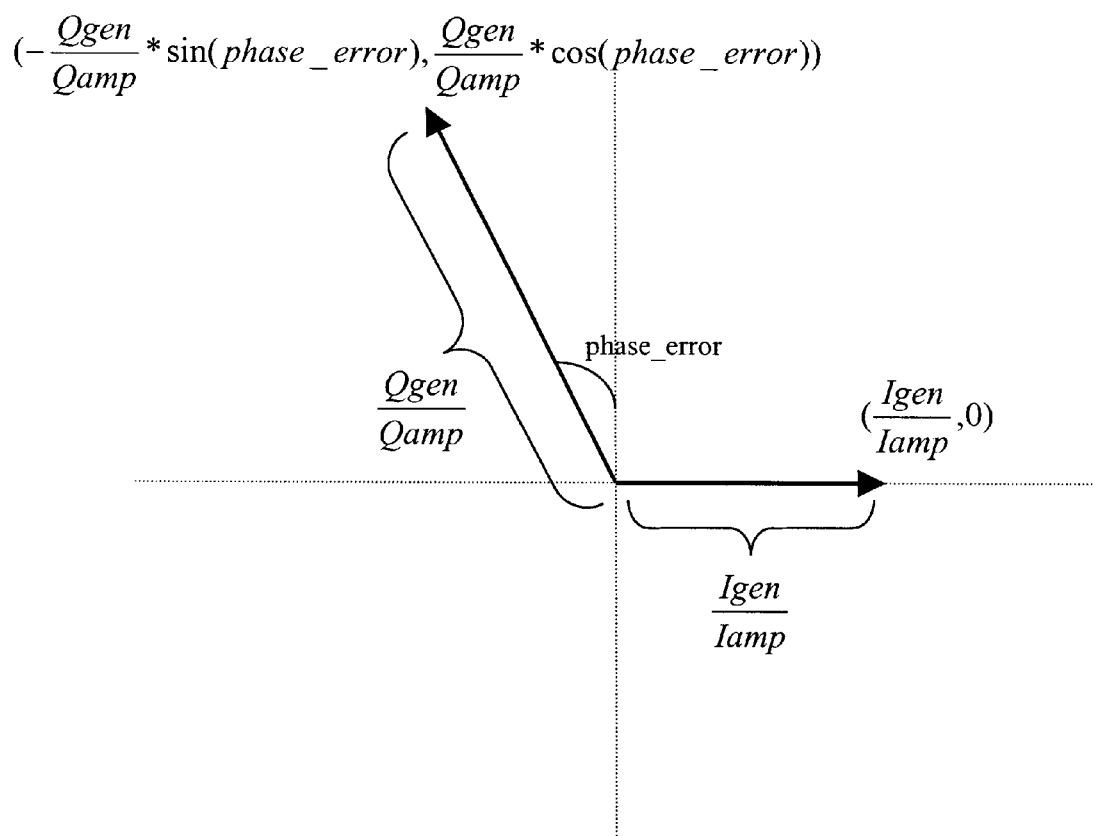
FIG. 5 is a diagram illustrating the relationship between terms that are utilized in a compensation algorithm to compensate for inaccuracies in the I, Q cosine waves generated by the hardware in accordance with the unit circle shown in FIG. 4.

The relationship between Igen, Qgen, Iamp, Qamp and the phase error (phase_error), can be seen in FIG. 5. This relationship is expressed by Equations 3 and 4.

$$Iout = \frac{Igen}{Iamp} - \frac{Qgen}{Qamp} * \sin(phase\_error) \quad \text{(Equation 3)}$$

$$Qout = \frac{Qgen}{Qamp} * \cos(phase\_error)$$

Igen and Qgen can be expressed as:

$$Igen = \left(Ides + Qdes * \frac{\sin(phase\_error)}{\cos(phase\_error)}\right) * Iamp, \text{ and} \quad \text{(Equation 4)}$$

$$Qgen = \frac{Qdes * Qamp}{\cos(phase\_error)}.$$

The terms Ides and Qdes are the I and Q values that are desired, i.e., the I and Q values that should be output from the DAC 31. These values Ides and Qdes are then set equal to Ides=1_on_unit_circle and Qdes=Q_on_unit_circle. Igen and Qgen may then be expressed as follows, while also correcting for offset errors:

$$Igen = (I\_unit\_circle * Iamp) + \quad \text{(Equation 5)}$$

$$\left(Q\_unit\_circle * Iamp * \frac{\sin(phase\_error)}{\cos(phase\_error)}\right) + Ioff,$$

and $$Qgen = \frac{Q\_unit\_circle * Qamp}{\cos(phase\_error)} + Qoff.$$

The compensation parameters that are provided to the DSP 40 by the main controller 41 via the compensation message are:

tx_i_amp=Iamp,
tx_qsec=Qamp/cos(phase_error),
tx_itan=Iamp*sin(phase_error)/cos(phase_error),
Ioff, and Qoff.

Substituting these parameters into Equation 5, Igen and Qgen can be expressed as:

Igen=(I_unit_circle*tx_i_Iamp)+(Q_unit_circle*tx_itan)+Ioff, and

Qgen=(Q_unit_circle*tx_qsec)+Qoff. (Equation 6)

Therefore, the values for Igen and Qgen, which are the I and Q values that need to be sent from the DSP 40 to the DAC 31, can be obtained from Equation 6.

One of the advantages of utilizing the compensation routine to obtain compensated values for I and Q is that relatively inexpensive hardware, which is more likely to cause the aforementioned degradations, can be utilized for the DAC 31 and the cosine generator hardware 32. However, it should be noted that it is not necessary that the compensation routine be utilized. Hardware components that do not cause these degradations can be utilized as opposed to utilizing the compensation routine of the present invention.

Some or all of the compensation parameters may be determined in the factory prior to the transceiver being implemented in the field. In order to take into account environmental conditions, some of the parameters may be determined in the field. Each transceiver typically will require that different compensation parameters be utilized. Therefore, some testing will need to be performed to determine the values of the compensation parameters that will be needed to cause the correct FM modulated signal to be output by the cosine wave generator 32. The testing can be accomplished using tools such as, for example, a spectrum analyzer. Those skilled in the art will understand the manner in which such testing can be performed to obtain the appropriate values for the compensation parameters.

Figure 6:
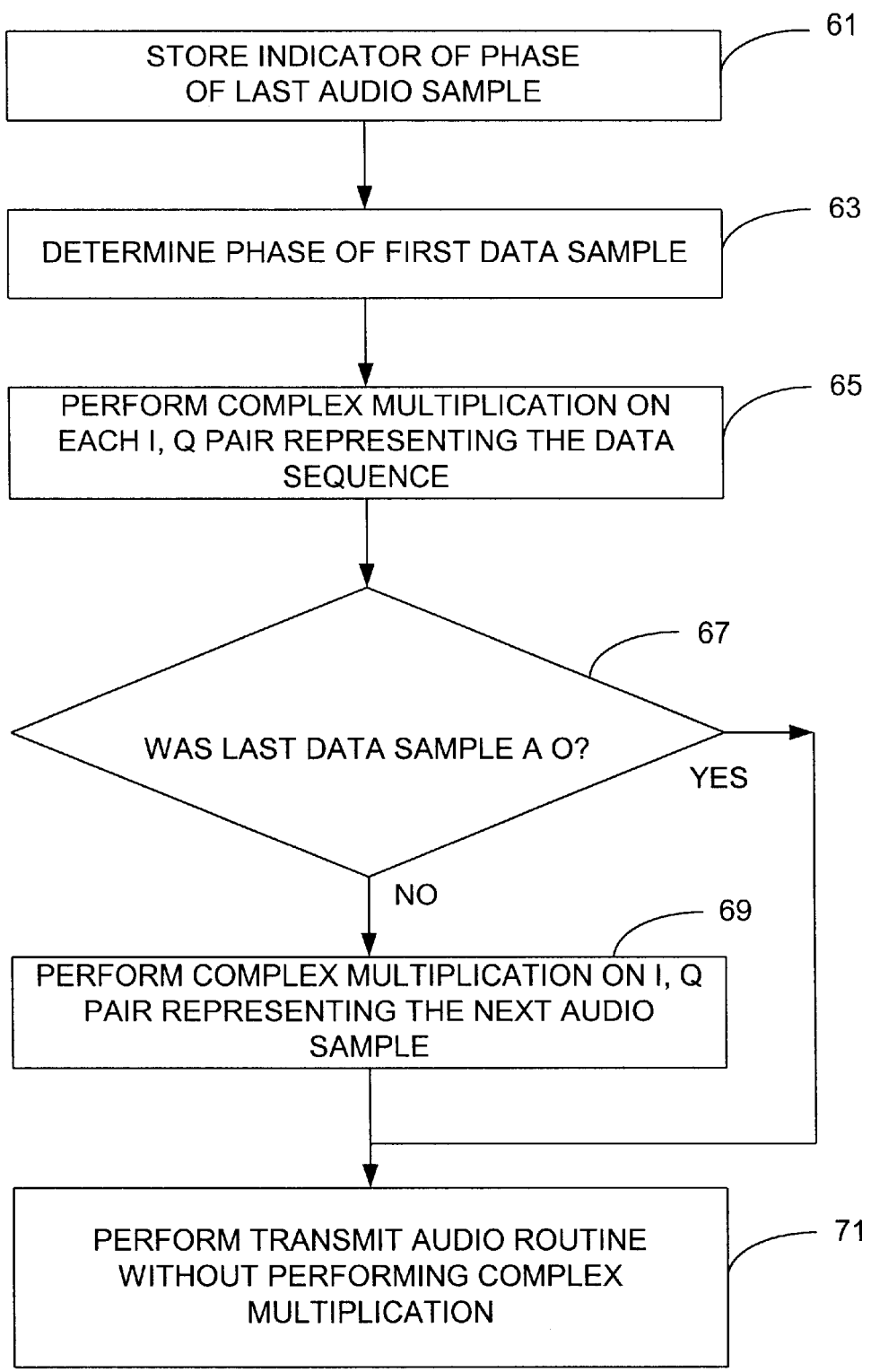
FIG. 6 is a flow chart illustrating the method of the present invention for transitioning between data transmission and audio transmission in accordance with the preferred embodiment.

The transmit-data routine will now be described with reference to FIG. 6. In order to enable the base station to send various types of messages to the mobile unit, such as messages indicating power level changes and hand-offs, the transmit-data routine of the present invention performs frequency shift keying by generating I, Q pairs to produce sequences of 1s and 0s. As stated above, by generating the appropriate sequence of I, Q pairs, the phase of the FM modulated signal can be altered. In FSK, 1s and 0s are represented by certain phase transitions in the FM modulated signal. Therefore, by using Equations 1and 2 above, the I, Q pairs needed to generate the appropriate sequence of 1s and 0s can be obtained. It should also be noted that, although the transmit-data routine is being described with reference to messages being sent from the base station to the mobile unit, the transmit-data routine may also be utilized in mobile units for sending messages from the mobile units to the base stations. This is also true for the transmit audio, receive audio and receive-data routines discussed herein.

Four different bit transitions can occur when performing FSK, namely, a 0-to-0transition, a 0-to-1transition, a 1-to-0transition and a 1-to-1transition. In accordance with the preferred embodiment of the present invention, four lookup tables are used for storing I and Q values for the respective transitions. To transition from a first bit that is a binary 0to a second bit that is a binary 0, the first I, Q pair representing the second bit must have a phase of 0°. To transition from a first bit that is a binary 0to a second bit that is a binary 1, the first I, Q pair representing the second bit must also have a phase of 0°. To transition from a first bit that is a binary 1 to a second bit that is a binary 0, the phase offset of the first I, Q pair representing the second bit must equal the phase of the last I, Q pair representing the first bit. To transition from a first bit that is a binary 1 to a second bit that is a binary 1, the phase offset of the first I, Q pair representing the second bit must equal the phase of the last I, Q pair representing the first bit.

Therefore, the phase of the first I, Q pair of a current bit depends on the phase of the last I, Q pair of the previous bit. Consequently, by selecting appropriate I, Q pairs for the current bit, the desired bit values can be generated. For example, if the previous bit is a 0, a 0-to-1 transition can be produced by selecting a first I, Q pair that produces a phase of 0° for the next bit. The addresses that are used to index each lookup table are based on which of these four transitions is occurring and the number of I, Q pairs that have already been output to produce the transition (i.e., where the routine is in the transition).

When the transceiver 30 of the present invention transitions from transmitting audio to transmitting data, and vice versa, abrupt changes in phase must be avoided. Therefore, steps must be taken to ensure that these transitions do not involve large, abrupt phase changes. In accordance with the present invention, when transitioning from audio to data, the transmit-data routine ensures that the phase offset of all of the I, Q pairs representing the stream of data is equal to the phase of the I, Q pair representing the last audio sample. During the transmit-audio routine discussed above, the DSP 40 stores an indicator of the phase of the I, Q pair representing the current audio sample, as indicated by block 61.

The transmit-data routine uses this stored indicator to determine what the phase of the first data sample should be, as indicated by block 63. The transmit-data routine ensures that the I, Q pair associated with the first sample of data has the same phase as the I, Q pair associated with the last sample of audio.

In accordance with the preferred embodiment, the transmit-data routine outputs I, Q pairs representing either a 0-to-0 or a 0-to-1 transition for the first data bit following the last audio bit. Thus, for the first data bit, the routine assumes that it is transitioning from a 0. The first I, Q pair in both of these lookup tables has a phase of 0°. From then on, the transmit-data routine selects the I, Q pairs from the lookup tables that provide the appropriate phase change. A complex multiplication is performed on all of the I, Q pairs representing the data samples to cause the phase of the I, Q pairs to be offset by the phase of the I, Q pair representing the last audio sample, as indicated by block 65. Those skilled in the art will understand the manner in which complex multiplication can be performed to change the phase associated with an I, Q pair to a desired phase.

Ensuring that the first I, Q pair associated with the first data sample has a phase of 0° facilitates the complex multiplication operations in that the routine is only required to ascertain the phase of the I, Q pair representing the last audio sample. In other words, by always beginning with a phase of 0° for the first I, Q pair associated with the first data bit, the routine must simply offset the phase of each I, Q pair associated with the data bits by whatever the phase is of the last audio sample. Otherwise, the routine would have to determine the phase of the last audio sample and the phase of the first I, Q pair used from the table in order to perform the complex multiplication process to offset the phase of the data bits. Therefore, forcing the phase of the I, Q pair associated with the first data bit to be 0° simplifies the phase offsetting process. However, it should be noted that this is simply an elegant, and therefore preferred, way of performing the phase offsetting process. Those skilled in the art will understand that the present invention is not limited to this preferred embodiment for performing the phase offsetting process.

When transitioning from transmitting data to transmitting audio, the transmit-audio routine ensures that the I, Q pair representing the first audio sample following the data has a phase offset equal to the phase of the last audio I, Q pair that was output before the data. This is accomplished by performing a complex multiplication on the I, Q pair representing the first audio sample following the data. However, in contrast to the complex multiplication operation performed when transitioning from audio to data, only the I, Q pair associated with the first audio sample following the data stream needs to be multiplied. The phase change performed on the first audio sample will be implicitly carried forward on the I, Q pairs representing the subsequent audio samples.

In accordance with the present invention, it has been determined that the phase of the first I, Q pair representing audio following the data only needs to be offset if the last bit of data was a 1. If the last bit of data was a 0, a phase offset does not need to be performed. The transmit-audio routine simply begins with an I, Q pair having the same phase as the phase of the last I, Q pair representing the last audio sample before the data. As stated above, the phase of the current audio sample is stored by the transmit-audio routine. The transmit-audio routine simply uses this phase to determine what the phase offset of the first I, Q pair representing the first audio sample following the data should be. The transmit-audio routine determines whether the last data bit was a 0 or a 1, as indicated by block 67. If it was a 0, the transmit audio routine is performed without performing the phase offset, as indicated by block 69.

It was also determined that, when a phase offset does need to be performed (i.e., when the last data bit was a 1), the phase offset is always the same. As stated above, this phase offset must cause the starting phase for the transmit-audio routine following the data to be equal to the phase of the last I, Q pair representing the last data sample before the data. This phase offset preferably is predetermined and stored in the DSP 40 (i.e., it is hard coded) for use by the transmit-audio routine. Therefore, the transmit-audio routine simply utilizes this pre-stored phase offset to perform the complex multiplication when the last bit of data is a 1. If the transmit-audio routine determines that the last data bit was a 1 (block 67), then the routine performs complex multiplication on the first I, Q pair associated with the first audio sample, as indicated by block 71, using the pre-stored phase offset.

The receive-data routine, in accordance with the preferred embodiment, will now be described with reference to FIGS. 7 and 8. When a data signal is received by the digital down converter 33 shown in FIG. 3, the data is in a format represented by, or similar to, the diagram shown in FIG. 7 (as modified by fading and noise). The data signal is physically represented as a sequence of (I, Q) values. A data message begins with an initial 64-bit dotting sequence 81, which is followed by radio link words (RLWs) 82. Each RLW 82 includes a 37-bit Dotting sequence 83 followed by an 11-bit Barker sequence 84, which is followed by 48 bits of data and BCH 85. The BCH bits represent a check sum. Each RLW 82 is repeated five times. Therefore, the DSP 40 has five opportunities to decode each RLW 82. The Dotting sequence 83 is used for clock recovery and the Barker sequence is used to determine where the first bit of data 85 begins.

As described in the aforementioned Air Interface Standard, the data is received from the mobiles in a frequency-modulated (FM) format, and not in the form of (I, Q) values as output by box 33 of FIG. 3. Thus, in an initial step, the data is converted from the (I, Q) format to FM.

The basic form of the I and Q values is described in Equation (2), above. In a naive approach, it is possible to perform a direct inversion to obtain the voltage $$V(n) = \frac{d}{dt}p(n)$$

by taking, for example, $$\frac{d}{dt}\arctan\left[\frac{Q(t)}{I(t)}\right].$$

However, numerical noise can be reduced and computational efficiency enhanced by the following alternate procedure. First obtain $\Delta I(n)=I(n)-I(n-1)$, $\Delta Q(n)=Q(n)-Q(n-1)$, and a signal-strength estimate $\gamma(n)=I^2(n)+Q^2(n)$. Then obtain the voltage from $$V(n) = c\frac{I(n)\Delta Q(n) - Q(n)\Delta I(n)}{\gamma(n)},$$

wherein c is a scaling constant. In the noisy environment typical of cellular systems, individual samples of V(n) are quite unreliable.

The several samples of V(n) taken during each bit cell are combined by a variant of the procedure described in U.S.

Pat. No. 4,596,024, commonly assigned herewith and hereby incorporated herein by reference. Reference is made to box 27 of FIG. 3 of the cited U.S. Pat. No. 4,596,024. The box 27 contains a table of values for a likelihood ratio $D_L(t, v)$. According to a currently preferred procedure, $D_L(t, v)$ is factored by a singular value decomposition (SVD) as described, e.g., in J. J. Dongarra et al., *LINPACK Users' Guide*, SIAM, Philadelphia (1979). That is, $D_L(t, v) \approx U(t) \cdot Z(v)$, wherein $U(t)$ is a weighting for the different samples within a bit cell, and $Z(v)$ is a nonlinear weighting of he voltage estimates. The summation $$B = \sum_{t=1}^{N} U(t) \cdot Z(V(t))$$

gives an initial estimate of the bit. As described in the above-cited work by Dongarra, details of U and Z differ slightly when detecting Dotting (when the clock is still to be determined) and when decoding bits.

In the latter case, an additional weighting is used. Because (see FIG. 7 herein) each word is repeated, the values of B obtained on the different repeats are again weighted. This may be represented by the expression $$\sum_{repeats} W_A(B_j) \cdot W_B(\overline{\gamma}_j),$$

wherein $W_A$ weights $B_j$ by its distance from nominal, and $W_B$ weights by the average signal strength during the bit on repeat j.

The Dotting sequences 81, 83 are sequences of 1s and 0s that produce a 5 kHz waveform, as required by the aforementioned Air Interface Standard. For the particular format shown in FIG. 7, the DSP 40 utilizes the initial Dotting sequence 81 to determine that a data message is being received, and thereafter utilizes the Dotting sequence 83 of each RLW 82 to help detect each RLW 83. The DSP 40 detects the Dotting sequences 81, 83 by measuring the level of 5 kHz energy received and the purity of the signal. The level of 5 kHz energy is measured by performing a frequency domain analysis, preferably by taking the Fourier Transform of the received signal. The purity of the signal relates to how much of the signal contains frequencies other than the frequency of 5 kHz. The purity condition is evaluated by obtaining the signal-to-noise and distortion (SINAD) ratio. If the level of 5 kHz energy exceeds a certain threshold level and the SINAD ration exceeds a certain threshold, the DSP 40 determines that the Dotting sequence has been detected and that a data message is being received. These steps are represented by block 92 in the flow chart shown in FIG. 8.

Once the Dotting sequence has been detected, the DSP 40 determines the phase of the 5 kHz signal, which synchronizes the DSP 40 to the start of each data bit. This is essentially clock recovery, which enables the DSP 40 to align with the bit cells. Those skilled in the art will understand the manner in which clock recovery can be performed using the Dotting sequence. In a currently preferred embodiment, this is done using the phase of the Fourier transform, which was mentioned above in regard to detecting Dotting. This step is represented by block 94 in FIG. 8. The DSP 40 then begins looking for the Barker sequence. Once the DSP 40 has detected the Dotting sequence and has performed clock recovery, the DSP 40 has determined that it has located the Dotting sequence, but it has not yet determined where it is in the Dotting sequence. The DSP 40 detects and uses the Barker sequence to determine where the data 85 begins. The step of detecting the Barker sequence is represented by block 96 in FIG. 7. The Barker sequence 84 is a specific sequence of 1s and 0s. The DSP 40 looks for this specific sequence and, when it has been detected, determines that the next bit is the first bit of data 85. Therefore, the DSP 40 utilizes the Barker sequence to align itself with the data 85, i.e., to determine where the first bit of the data 85 begins. This step is represented by block 98 in FIG. 8.

Once the data 85 has been located, the DSP 40 decodes the data. In order to decode the data, the processor evaluates the bits of a particular number of repeats of an RLW before determining whether any bit represents a binary 1 or a binary 0. For each repeat, the processor evaluates each bit to determine whether it is likely to be a binary 1 or a binary 0. Once the bits have been evaluated for a particular number of repeats, the processor uses the results of all of the evaluations to determine whether each bit is a binary 1 or a binary 0. In accordance with the preferred embodiment, the DSP 40 looks at each bit of the data 85 for each RLW 82 of the five repeats and generates and stores a confidence factor associated with each bit. This step is represented by block 100.

The confidence factor is based on how closely the waveform represents a 1 or a 0 as well as the signal strength associated with the signal. If the waveform is relatively noisy, or if the RF signal strength is low, the DSP 40 assigns less weight to its determination as to whether the waveform represents a 1 or a 0. If the waveform has relatively little noise and if the RF signal strength is relatively high, the DSP 40 assigns more weight to its determination as to whether the waveform represents a 1 or a 0. Once this process has been performed for each repeat of the current RLW 82, the DSP 40 takes the sum of the confidence factors associated with each bit for each RLW 82 for all five repeats and compares the sum to a threshold level, which preferably is 0. If the sum is greater than the threshold level, the DSP 40 determines that the bit is a 1. If the sum is less than the threshold level, the DSP 40 determines that the bit is a 0.

This process of assigning confidence factors for each of the bits of each of the five repeats is also performed for the Dotting and the Barker sequences. For each of the five repeats, the DSP 40 obtains a confidence factor associated with each bit of the combined Dotting and Barker sequences in the aforementioned manner. Therefore, by the end of the five repeats, the DSP 40 has determined whether each bit of the combined sequence is a 1 or a 0. The steps associated with utilizing the confidence factors to determine whether the bits are 1s or 0s are represented by block 101 in FIG. 8. As stated above, the Dotting and Barker sequences are specific, known sequences. The DSP 40 compares the results of the determination to what the combined sequence is known to be and determines the number of bit errors that have occurred. This step is represented by block 103 in FIG. 8. If the number of bit errors exceeds a predetermined threshold, the DSP 40 aborts message processing. This step is represented by block 104 of FIG. 8. The DSP 40 could instead use only the Barker sequence for this purpose, but using both the Barker and Dotting sequences provides better results.

Although the base station and the mobile unit are both using a 10 kHz clock frequency, the clocks are not ideal and therefore tend to drift. This could potentially cause the DSP 40 to lose its alignment with the data. Therefore, the receive-data routine performs a clock tracking routine that enables the DSP 40 to periodically realign with the beginning of the bit cells. In accordance with the preferred embodiment, the phase is adjusted every 5 ms. There are 12 samples per bit cell. There are 10 bit cells per ms. Therefore, there are 120 samples per ms, which corresponds to 600 samples every 5 ms. The inner product is taken for each 120 samples corresponding to each of the 10 respective bit cells per ms. This is done for all 600 samples associated with the 5 ms period. The result of each dot product is used to update an "aggregate phase shift" variable. At the end of each 5 ms period, the phase is adjusted in accordance with the value of the "aggregate phase shift" variable. Therefore, every 5 ms, the receive-data routine realigns the DSP 40 with the beginning of the bit cell.

The present invention also provides a signaling tone detection routine that is used to distinguish between when data 85 is being received and when signaling tone is being received. Signaling tones of various duration are transmitted from the mobile unit to the base station to communicate various types of information to the base station.

Signaling tone is represented by a sequence of all 0s or by a sequence of all 1s, which corresponds to a 10 kHz sine wave. When a predetermined threshold level of 10 kHz energy has been detected for a predetermined period of time, the signaling tone detection routine determines that signaling tone has been detected. If the sequence of data bits 85 contained in an RLW is either a long sequence of 0s or a long sequence of 1s, the sequence could have sufficient 10 kHz energy to cause the processor to confuse the sequence for signaling tone. In order to avoid this problem, the number of bit errors in the Dotting and Barker sequences are checked after each RLW to determine whether or not data is being received.

Generally, if a relatively small number of bit errors are found in the Dotting/Barker sequence, then the signaling tone detector state will be modified to reflect the fact that no signaling tone energy has arrived during the receipt of the last RLW. Conversely, if too many bit errors are found in the Dotting/Barker sequence, then the signaling tone detector state will be modified to reflect any signaling tone energy that has arrived during the receipt of the last RLW. The manner in which the signaling tone detection routine performs these tasks will now be described with reference to FIG. 9.

The signaling tone detection routine is constantly running and is independent of the receive-data routine previously discussed. However, certain state variables and determinations that are made by the receive-data routine are utilized by the signaling tone detection routine. The signaling tone detection routine uses the determination made by the receive-data routine as to whether or not a data message is being processed, as indicated by block 110. As stated above, the receive-data routine knows what these sequences should be and makes a determination for each RLW as to whether these sequences have been detected. Block 110 in FIG. 9 corresponds to this determination being made for the first RLW.

Once that determination has been made, a determination is made as to whether or not the level of 10 kHz energy has just risen above a predetermined threshold level for a predetermined period of time. The level of 10 kHz energy is determined by performing a Fourier Transform and by comparing the result to the predetermined threshold level. This level of energy is stored in the energy level variable. Next, the signaling tone detection routine determines whether the energy level has just exceeded the predetermined threshold level for a predetermined period of time, as indicated in block 113. If so, an indicator will be stored, as indicated by block 114. If, however, the energy level has already been determined to be above a predetermined threshold level for a predetermined period of time, the indicator that signaling tone has just been detected will not be modified.

A determination is then made at block 115 as to whether a period of 50 ms has passed, which corresponds to the amount of time required for five repeats of the RLW. If 50 ms have passed, a determination will be made at block 1 16 as to whether the Dotting and Barker sequences associated with the latest RLW have been detected. As stated above, the receive-data routine determines the number of bit errors that are in the Dotting and Barker sequences by using the aforementioned confidence factors associated with each bit for all five repeats of the RLW. If the number of bit errors associated with the Dotting and Barker sequences is small enough to result in a determination that those sequences have been detected, then signaling tone detection routine will determine at block 116 that a data message is being received. Any required action will then be performed by the DSP 40, as indicated by block 118, and the process will proceed to the beginning of the routine.

If a determination is made at block 116 that the number of bit errors indicate that the Dotting and Barker sequences have not been detected, the process will proceed to block 117 and the DSP 40 will use the aforementioned stored indicator in performing any required actions associated with the detection of signaling tone.

Figure 8:
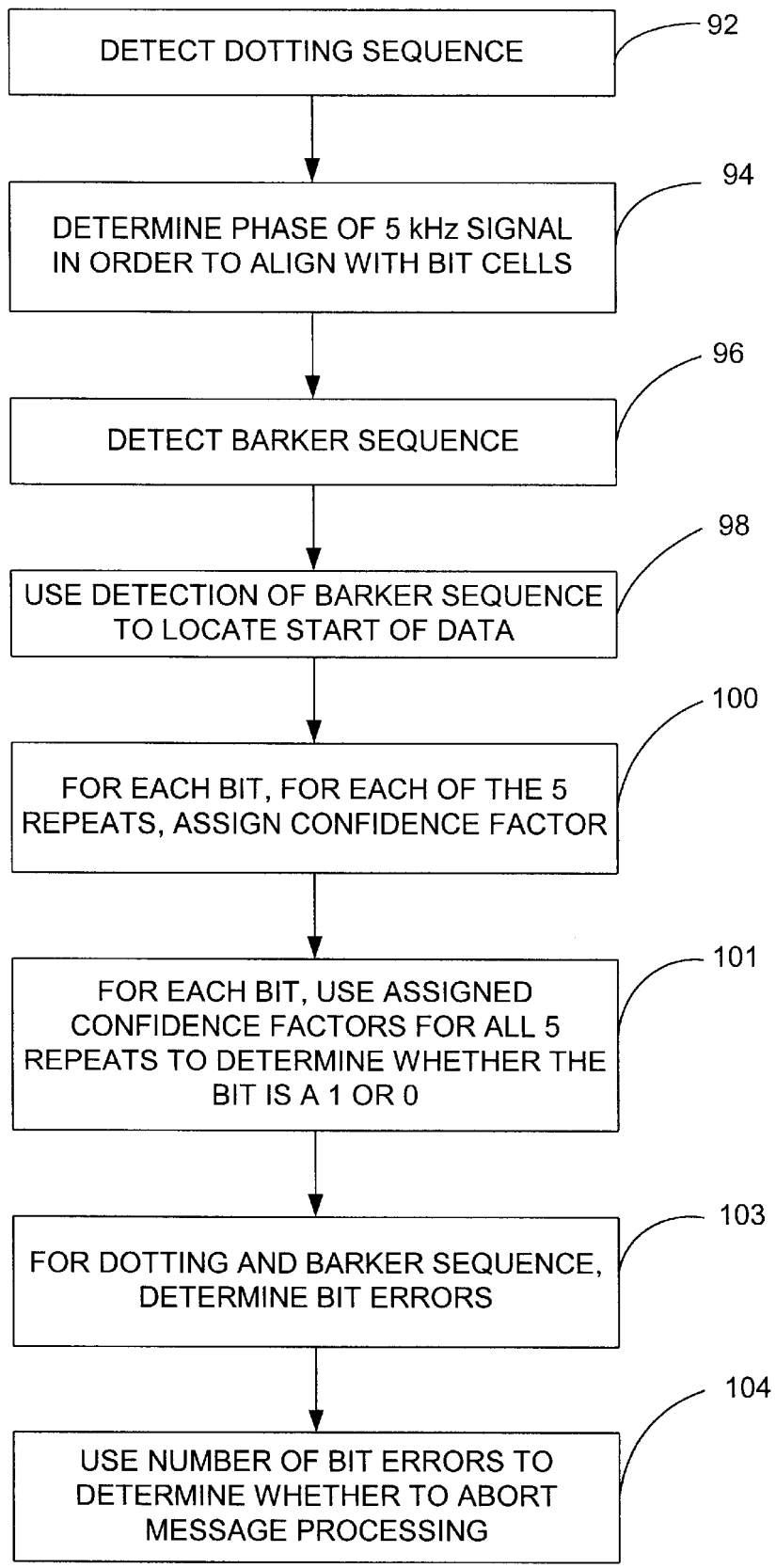
FIG. 8 is a flow chart illustrating the method of the present invention for performing the receive-data routine.
Figure 9:
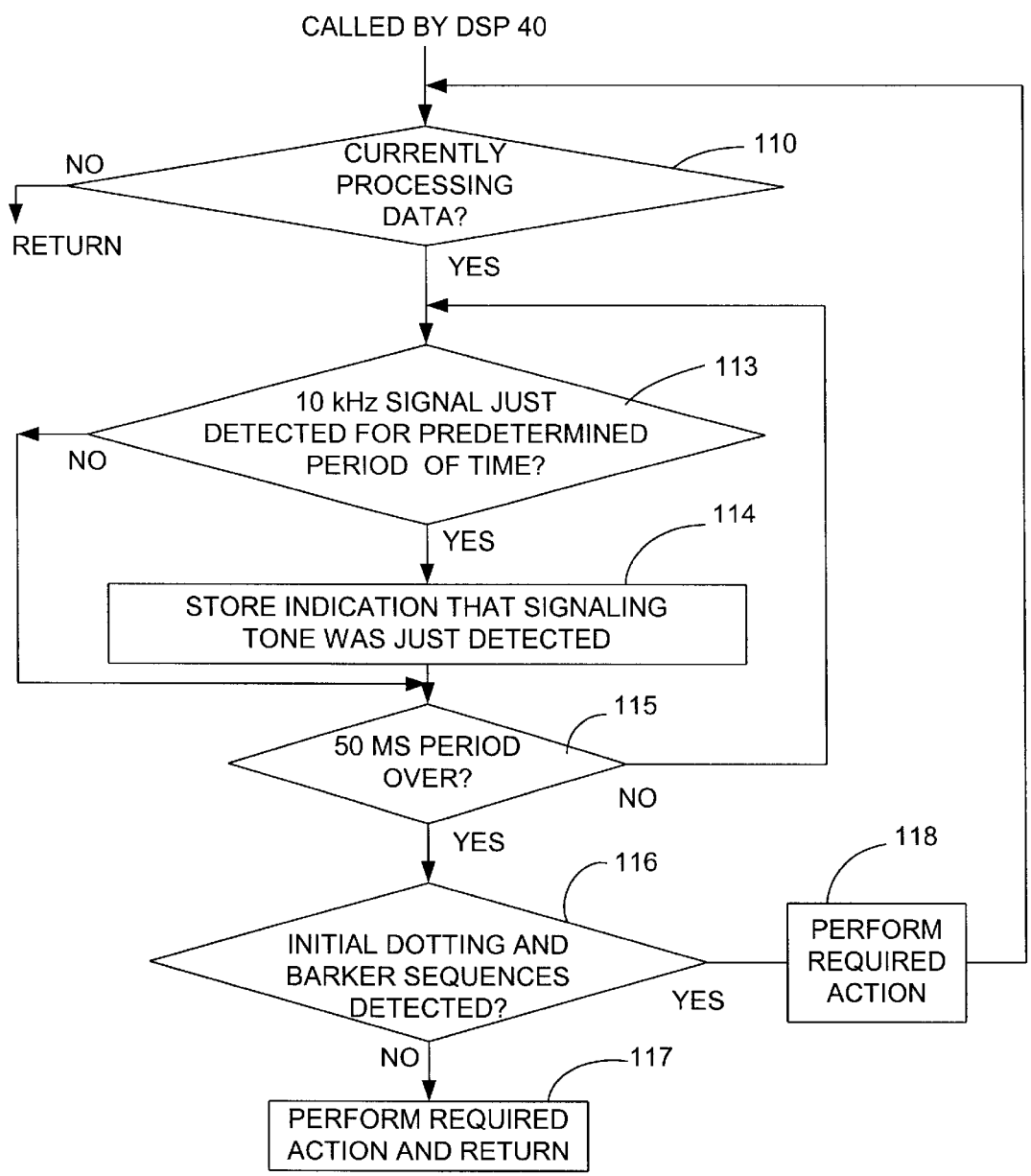
FIG. 9 is a flow chart illustrating the method of the present invention for performing the signaling tone detection routine.

It should be noted that the flow charts of FIGS. 8 and 9 are merely function representations of the manner in which the receive-data routine and the signaling tone detection routines are performed. These flow charts are not intended to represent the actual code that is utilized to implement the functions discussed herein. However, those skilled in the art will understand the manner in which the functions represented by the flow charts of FIGS. 8 and 9 may be implemented, and that they may be implemented in a variety of different ways. Therefore, it will be understood that the present invention is not limited to any particular computer program for performing these functions.

The manner in which the DSP 40 and the main controller 41 communicate will now be described. The DSP 40 can be programmed to communicate with the main controller 41 in such a way that the main controller 41 treats the DSP 40 as if it were three independent processors. This enables the DSP 40 to be utilized with a main controller that has been pre-configured to operate in conjunction with these processors. For example, if a main controller has been configured to communicate with a separate encoder component, a separate decoder component and a separate baseband component, the DSP 40 can be programmed to spoof the main controller in such a way that the main controller operates as if it were communicating with these separate components when, in fact, it is only communicating with the DSP 40. The functions associated with the encoder and decoder components have previously been described herein. The baseband component typically processes the audio signal in both the forward and reverse directions. The manner in which a baseband component operates is known in the art of wireless communications. Therefore, a detailed discussion of the operations performed by a baseband component will not be provided herein.

In accordance with this embodiment, separate queues in the DSP 40 are provided for each of these separate components. One queue would receive messages from the main controller 41 that are intended for the encoder component. Another queue would receive messages from the main controller 41 that are intended for the decoder component.

Another queue would receive messages from the main controller 41 that are intended for the baseband component. Each message from the main controller 41 contains a field that the DSP 40 utilizes to determine whether the message is an encoder flavor message, a decoder flavor message, or a baseband flavor message. The DSP 40 detects these packets and assigns the messages to the appropriate queue in the DSP 40. The DSP 40 simultaneously and independently processes the decoder, encoder and baseband messages on a first-in first-out (FIFO) basis. The bus lines that would have been used to connect the main controller 41 to the separate components would instead be connected to the DSP 40, or to an interface component that is connected to the DSP 40.

Of course, it is not necessary that a main controller 41 pre-configured in this way be utilized with the transceiver 30 of the present invention. This feature of the present invention merely provides flexibility with respect to the manner in which the present invention is implemented.

It should be noted that the present invention has been described with reference to the preferred embodiments, but that the present invention is not limited to these embodiments. Those skilled in the art will understand that modifications may be made to the embodiments discussed above without deviating from the spirit and scope of the invention. For example, the present invention is not limited to any particular frequencies. Also, although the DSP 40 has been described as performing all of the decoding and encoding tasks, other types of processors may be used for this purpose provided they have sufficient processing capability. Also, although the DSP 40 preferably stores at least some of the tables and other information that it uses to perform the encoding and decoding tasks, memory that is external to the DSP 40 may be used for this purpose. Any type of computer-readable memory device is suitable for this purpose, including solid state memory devices, such as read only memory (ROM) and random access memory (RAM), as well as compact disk read only memory (CD ROM) and magnetic memory devices.

Furthermore, the functions that are performed by the DSP 40 may also be performed by other types of processing devices or circuits, provided they have suitable processing capability. For example, an application specific integrated circuit (ASIC) may also be used for this purpose. A circuit comprised solely of discrete hardware components could also be configured to perform these tasks. Therefore, the present invention may be implemented using any type of hardware or any combination of software and hardware. All of these possible implementations will be referred to herein generally as logic. Thus, the term "logic", as that term is used herein, is intended to denote any type hardware implementation and any type of hardware/software implementation that is capable of being configured to perform these tasks.

Figure 7:
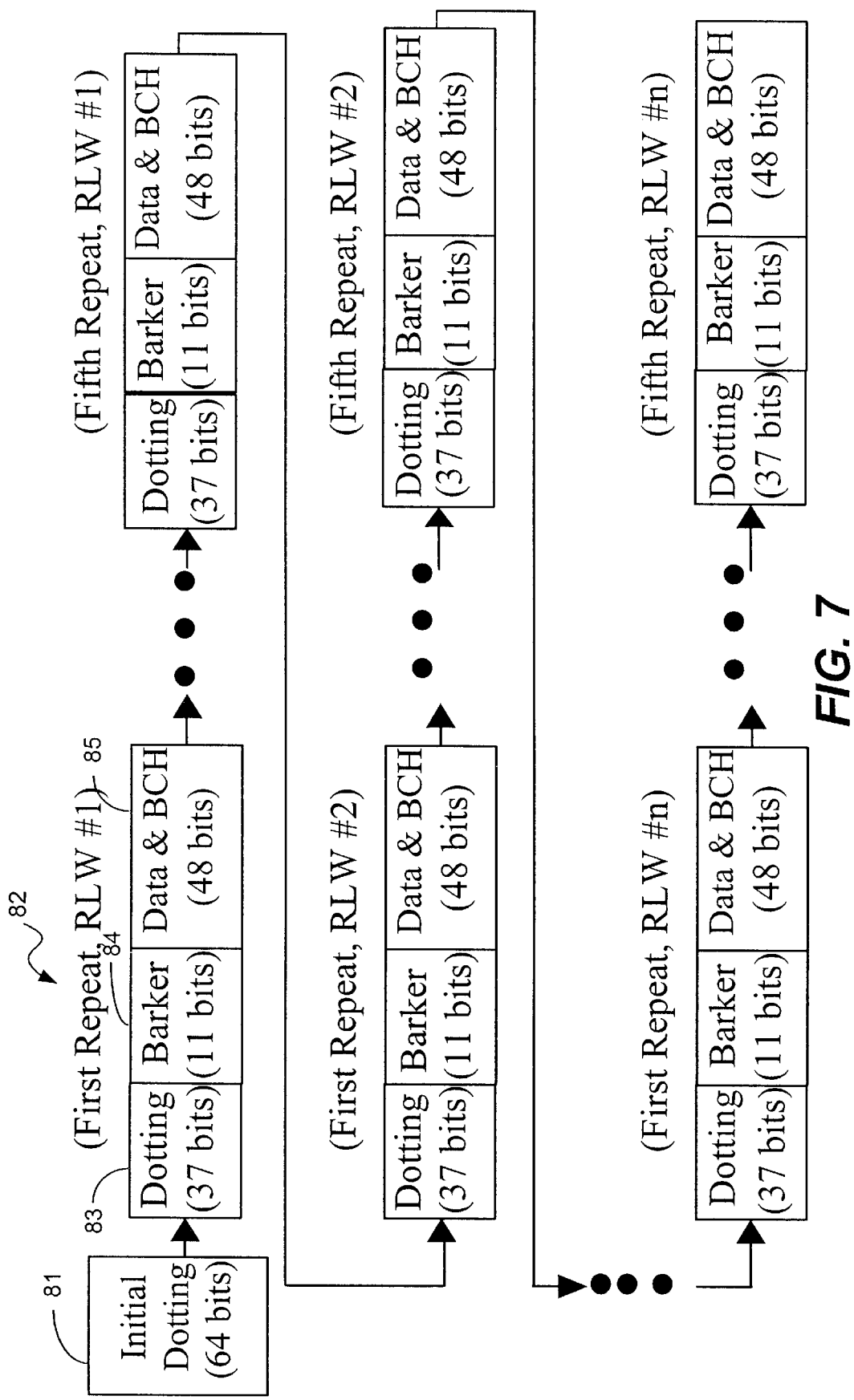
FIG. 7 is a diagram illustrating the content of a data message that is received and decoded by the DSP of the transceiver shown in FIG. 3.

It should also be noted that the present invention is not limited to the format of the message shown in FIG. 7. Those skilled in the art will understand that the data message format can be altered in virtually an infinite number of ways and that the receive-data routine can be altered to decode the message accordingly. Those skilled in the art will understand that other modifications can be made to the embodiments discussed above without deviating from the spirit and scope of the present invention. The modifications suggested above are merely examples of modifications that can be made.

What is claimed is:

1. An apparatus for transmitting signals over a wireless network in an analog mode, the apparatus comprising:

first logic, the first logic receiving digital signals representing the signals to be transmitted over the wireless network, the first logic being configured to generate digital in-phase (I) and quadrature (Q) values representing said digital signals;

second logic in communication with the first logic, the second logic being configured to convert the digital I and Q values into analog I and Q values; and third logic in communication with the second logic, the third logic being configured to convert the analog I and Q values into two cosine waves that are substantially 90° out of phase from each other, the third logic being configured to sum the cosine waves for transmission over the wireless network, wherein the digital I and Q values represent I and Q values on a unit circle obtained from an equation:

$$I(n)=\cos(p(n)), \text{ and}$$

$$Q(n)=\cos(p(n)-90 \text{ degrees}),$$

where n is a sample index that is incremented at a particular sample rate, $p(n)$ is a phase of a current sample of said digital signals received by said first logic, and $p(n-1)$ is a phase of an immediately preceding sample of said digital signals received by said first logic, and wherein a relationship between an amplitude of the current sample and the phase $p(n)$ of the current sample can be expressed by an equation:

$$p(n)=p(n-1)+k*a(n),$$

where $a(n)$ is the amplitude of the current sample and k is a scaling constant selected to obtain a desired relationship between $a(n)$ and a peak frequency deviation of the summed cosine waves.

2. The apparatus of claim 1, wherein the first logic is a digital signal processor (DSP) and said digital signals are digital audio signals, and wherein the DSP is programmed to convert the digital audio signals into said digital I and Q values.

3. The apparatus of claim 1, wherein the first logic is a digital signal processor (DSP) and said digital signals are digital data signals, and wherein the digital I and Q values generated by the first logic represent the digital data signals, the DSP being programmed to convert the digital data signals into said digital I and Q values.

4. The apparatus of claim 3, wherein the digital data signals conform to a frequency shift keying (FSK) communications format.

5. The apparatus of claim 1, wherein the apparatus is comprised in a base station of the wireless network and wherein the digital data signals correspond to messages being sent from the base station to at least one mobile unit of the wireless network.

6. The apparatus of claim 1, wherein prior to the digital I and Q values being received by the second logic, the first logic modifies the digital I and Q values into modified digital I and Q values to compensate for non-idealities in the second and third logic.

7. The apparatus of claim 1, wherein the second logic comprises a digital-to-analog converter (DAC) and wherein the third logic comprises a cosine wave generator, the non-idealities including errors in voltages produced by the DAC and phase errors in the cosine waves produced by the cosine wave generator.

8. An apparatus for transmitting signals over a wireless network in an analog mode, the apparatus comprising:

first logic, the first logic receiving digital signals representing the signals to be transmitted over the wireless network, the first logic being configured to generate digital in-phase (I) and quadrature (Q) values representing said digital signals;

second logic in communication with the first logic, the second logic being configured to convert the digital I and Q values into analog I and Q values; and third logic in communication with the second logic, the third logic being configured to convert the analog I and Q values into two cosine waves that are substantially 90° out of phase from each other, the third logic being configured to sum the cosine waves for transmission over the wireless network, wherein the first logic is a digital signal processor (DSP) and said digital signals are digital audio signals and digital data signals, and wherein the DSP is programmed to convert the digital audio signals and digital data signals into said digital I and Q values, each of the digital audio signals and digital data signals being comprised of a plurality of audio samples and data samples, respectively, each of the samples being represented by pairs of the I and Q values, each pair of I and Q values having a phase associated therewith, wherein when the apparatus transitions from transmitting signals associated with audio samples to transmitting signals associated with data samples, the first logic ensures that the pairs of I and Q values representing the data samples following a last audio sample have phases that are offset by a phase amount equal to the phase of the pair of I and Q values representing said last audio sample, and wherein the first logic offsets the phases of the pairs of I and Q values representing the data samples following said last audio sample by performing a complex multiplication operation on each pair of I and Q values representing the data samples following said last audio sample.

9. The apparatus of claim 8, wherein when the apparatus transitions from transmitting signals associated with data samples to transmitting signals associated with audio samples, the first logic ensures that a first pair of I and Q values representing a first audio sample following a last data sample has a phase offset equal to the phase of the pair of I and Q values representing said last audio sample.

10. The apparatus of claim 8, wherein the first logic ensures that the pair of I and Q values representing said first audio sample following said last data sample has a phase offset equal to the phase of the pair of I and Q values representing said last audio sample by performing a complex multiplication operation on the pair of I and Q values representing said first audio sample.

11. The apparatus of claim 10, wherein the complex multiplication operation is only performed on the pair of I and Q values representing said first audio sample if the first logic determines that said last data sample corresponds to a binary 1.

12. The apparatus of claim 8, wherein the audio and data samples conform to a frequency shift keying (FSK) communications format.

13. A method for transmitting signals over a wireless network in an analog mode, the method comprising the steps of:

generating digital signals representing the signals to be transmitted over the wireless network;

generating digital in-phase (I) and quadrature (Q) values representing the digital signals;

converting the digital I and Q values into analog I and Q values;

converting the analog I and Q values into two cosine waves that are substantially 90° out of phase from each other; and summing the cosine waves for transmission over the wireless network, wherein the digital I and Q values represent I and Q values on a unit circle obtained from an equation:

$I(n)=\cos(p(n))$, and $Q(n)=\cos(p(n)-90 \text{ degrees})$, where n is a sample index that is incremented at a particular sample rate, p(n) is a phase of a current sample of said digital signals, and p(n−1) is a phase of an immediately preceding sample of said digital signals, and wherein a relationship between an amplitude of the current sample and the phase p(n) of the current sample can be expressed by an equation:

$p(n)=p(n-1)+k*a(n)$, where a(n) is the amplitude of the current sample and k is a scaling constant selected to obtain a desired relationship between a(n) and a peak frequency deviation of the summed cosine waves.

14. The method of claim 13, wherein the step of generating the I and Q values is performed in a digital signal processor (DSP), the DSP being programmed to convert the digital signals representing the signals to be transmitted over the wireless network into said digital I and Q values.

15. The method of claim 13, wherein the digital signals are digital audio signals, and wherein the digital I and Q values generated by the first logic represent the digital audio signals, the DSP being programmed to convert the digital audio signals into said digital I and Q values.

16. The method of claim 13, wherein the digital signals are digital data signals, and wherein the digital I and Q values generated by the first logic represent the digital data signals, the DSP being programmed to convert the digital data signals into said digital I and Q values.

17. The method of claim 16, wherein the digital data signals conform to a frequency shift keying (FSK) communications format.

18. The method of claim 17, wherein the digital data signals correspond to messages being sent from a base station to at least one mobile unit of the wireless network.

19. The method of claim 13, wherein prior to the digital I and Q values being converted into analog I and Q values, the digital I and Q values are modified into modified digital I and Q values to compensate for non-idealities in hardware utilized to perform the steps of converting the digital I and Q values into analog I and Q values, converting the analog I and Q values into two cosine waves, and summing the cosine waves.

20. The method of claim 15, wherein the step of generating digital I and Q values is performed by a processor programmed to generate the digital I and Q values representing said digital signals, and wherein said digital signals include digital audio signals and digital data signals, each of the digital audio signals and digital data signals being comprised of a plurality of audio samples and data samples, respectively, each of the samples being represented by pairs of the I and Q values, each pair of I and Q values having a phase associated therewith, wherein when an apparatus performing said method transitions from transmitting signals associated with audio samples to transmitting signals associated with data samples, the processor ensures that the pairs of I and Q values representing the data samples following a last audio sample have phases that are offset by a phase amount equal to the phase of the pair of I and Q values representing said last audio sample.

21. A method for transmitting signals over a wireless network in an analog mode, the method comprising the steps of:

generating digital signals representing the signals to be transmitted over the wireless network;

generating digital in-phase (I) and quadrature (Q) values representing the digital signals;

converting the digital I and Q values into analog I and Q values;

converting the analog I and Q values into two cosine waves that are substantially 90° out of phase from each other; and summing the cosine waves for transmission over the wireless network wherein the processor offsets the phases of the pairs of I and Q values representing the data samples following said last audio sample by performing a complex multiplication operation on each pair of I and Q values representing the data samples following said last audio sample, and wherein the step of generating digital I and Q values is performed by a processor programmed to generate the digital I and Q values representing said digital signals, and wherein said digital signals include digital audio signals and digital data signals, each of the digital audio signals and digital data signals being comprised of a plurality of audio samples and data samples, respectively, each of the samples being represented by pairs of the I and Q values, each pair of I and Q values having a phase associated therewith, wherein when an apparatus performing said method transitions from transmitting signals associated with audio samples to transmitting signals associated with data samples, the processor ensures that the pairs of I and Q values representing the data samples following a last audio sample have phases that are offset by a phase amount equal to the phase of the pair of I and Q values representing said last audio sample, and wherein the processor offsets the phases of the pairs of I and Q values representing the data samples following said last audio sample by performing a complex multiplication operation on each pair of I and Q values representing the data samples following said last audio sample.

22. The method of claim 21, wherein when said apparatus performing said method transitions from transmitting signals associated with data samples to transmitting signals associated with audio samples, the processor ensures that a first pair of I and Q values representing a first audio sample following a last data sample has a phase offset equal to the phase of the pair of I and Q values representing said last data sample.

23. The method of claim 21, wherein the processor ensures that the pair of I and Q values representing the said first audio sample following said last data sample has a phase offset equal to the phase of the pair of I and Q values representing said last data sample by performing a complex multiplication operation on the pair of I and Q values representing said first audio sample.

24. The method of claim 22, wherein the audio and data samples conform to a frequency shift keying (FSK) communications format.

25. A computer program for use in transmitting signals over a network, the computer program being embodied on a computer-readable medium, the computer program comprising:

a first code segment for generating digital in-phase (I) and quadrature (Q) values representing digital signals, the digital signals representing the signals to be transmitted over the network;

a second code segment for modifying the digital I and Q values into modified digital I and Q values to compensate for non-idealities in hardware utilized for transmitting the signals over the network, and wherein said digital signals include digital audio signals and digital data signals, each of the digital audio signals and digital data signals being comprised of a plurality of audio samples and data samples, respectively, each of the samples being represented by pairs of the I and Q values, each pair of I and Q values having a phase associated therewith, wherein when the digital signals transition from audio samples to data samples, the first code segment ensures that the pairs of I and Q values representing the data samples following a last audio sample have phases that are offset by a phase amount equal to the phase of the pair of I and Q values representing said last audio sample.

26. The computer program of claim 25, wherein the digital I and Q values represent I and Q values on a unit circle, the I and Q values on the unit circle obtained by the first code segment by executing an algorithm represented by an equation:

$I(n)=\cos(p(n))$, and $Q(n)=\cos(p(n)-90 \text{ degrees})$, where n is a sample index that is incremented at a particular sample rate, p(n) is a phase of a current sample of said digital signals, and p(n−1) is a phase of an immediately preceding sample of said digital signals, and wherein a relationship between an amplitude of the current sample and the phase p(n) of the current sample can be expressed by an equation:

$p(n)=p(n-1)+k*a(n)$, where a(n) is the amplitude of the current sample and k is a scaling constant selected to obtain a desired relationship between a(n) and a peak frequency deviation of two summed cosine waves, a first one of the two cosine waves having an amplitude that is proportional to I(n) and a second one of the two cosine waves having an amplitude proportional to Q(n).

27. The computer program of claim 25, wherein the first code segment offsets the phases of the pairs of I and Q values representing the data samples following said last audio sample by performing a complex multiplication operation on each pair of I and Q values representing the data samples following said last audio sample.

28. The computer program of claim 27, wherein when the digital signals transition from audio samples to data samples, the first code segment ensures that a first pair of I and Q values representing a first audio sample following a last data sample has a phase equal to the phase of the pair of I and Q values representing said last audio sample.

29. The computer program of claim 28, wherein the first code segment ensures that the pair of I and Q values representing the said first audio sample following said last data sample has a phase equal to the phase of the pair of I and Q values representing said last audio sample by performing a complex multiplication operation on the pair of I and Q values representing said first audio sample.

* * * * *